United States Patent
Yi et al.

(10) Patent No.: US 10,701,589 B2
(45) Date of Patent: *Jun. 30, 2020

(54) METHOD AND DEVICE FOR TRANSMITTING/RECEIVING LAYER-2 PDUS IN A WIRELESS COMMUNICATION SYSTEM

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/250,701

(22) Filed: Jan. 17, 2019

(65) Prior Publication Data

US 2019/0159067 A1    May 23, 2019

Related U.S. Application Data

(63) Continuation of application No. 15/775,720, filed as application No. PCT/KR2017/004476 on Apr. 27, 2017, now Pat. No. 10,334,477.

(Continued)

(51) Int. Cl.
*H04W 4/00*          (2018.01)
*H04W 28/06*         (2009.01)
(Continued)

(52) U.S. Cl.
CPC .......... *H04W 28/065* (2013.01); *H04L 47/34* (2013.01); *H04L 69/324* (2013.01); *H04W 72/1289* (2013.01); *H04W 72/042* (2013.01)

(58) Field of Classification Search
CPC ............ H04W 28/065; H04W 72/042; H04W 72/1289; H04L 47/34; H04L 69/324
See application file for complete search history.

(56) References Cited

U.S. PATENT DOCUMENTS

| 7,539,197 | B2 | 5/2009 | Lee et al. |
| 7,675,941 | B2 * | 3/2010 | Kim ...................... H04L 1/1841 370/329 |

(Continued)

FOREIGN PATENT DOCUMENTS

| JP | 2007300630 | 11/2007 |
| JP | 2009-207162 | 9/2009 |

(Continued)

OTHER PUBLICATIONS

U.S. Appl. No. 15/775,720, Office Action dated Nov. 27, 2018, 12 pages.

(Continued)

*Primary Examiner* — Abdelnabi O Musa
(74) *Attorney, Agent, or Firm* — Lee Hong Degerman Kang Waimey

(57) ABSTRACT

In the present invention, the transmitting device attaches a sequence number (SN) for each of service data unit (SDU) elements to generate a protocol data unit (PDU) containing the SDU elements. Each of the SDU elements is a SDU or SDU segment. The PDU includes the SDU elements and respective SNs for the SDU elements. The PDU includes an indicator for each of the SDU elements, and the indicator indicating whether a corresponding SDU element is a SDU or SDU segment.

10 Claims, 10 Drawing Sheets

Related U.S. Application Data

(60) Provisional application No. 62/331,392, filed on May 3, 2016.

(51) Int. Cl.
*H04L 29/08* (2006.01)
*H04L 12/801* (2013.01)
*H04W 72/12* (2009.01)
*H04W 72/04* (2009.01)

(56) References Cited

U.S. PATENT DOCUMENTS

| | | | |
|---|---|---|---|
| 8,102,880 B2 * | 1/2012 | Charpentier | H04L 5/0046 370/474 |
| 8,199,757 B2 | 6/2012 | Pani et al. | |
| 8,737,421 B2 | 5/2014 | Zhang et al. | |
| 8,774,108 B2 * | 7/2014 | Yi | H04W 76/32 370/329 |
| 8,848,583 B2 | 9/2014 | Huang et al. | |
| 9,942,805 B2 | 4/2018 | Jinnu et al. | |
| 10,045,254 B2 | 8/2018 | Yu et al. | |
| 2002/0174276 A1 * | 11/2002 | Jiang | H04W 28/06 710/105 |
| 2007/0133470 A1 | 6/2007 | Cha et al. | |
| 2007/0253447 A1 | 11/2007 | Jiang | |
| 2009/0003283 A1 | 1/2009 | Meylan | |
| 2009/0116490 A1 | 5/2009 | Charpentier et al. | |
| 2010/0014446 A1 | 1/2010 | Chun et al. | |
| 2011/0199998 A1 | 8/2011 | Yi et al. | |
| 2012/0042222 A1 * | 2/2012 | Cha | H04L 1/1664 714/749 |
| 2018/0343584 A1 | 11/2018 | Yi et al. | |

FOREIGN PATENT DOCUMENTS

| | | |
|---|---|---|
| JP | 2010-527544 | 8/2010 |
| JP | 2012-514390 | 6/2012 |
| WO | 2008078365 | 4/2010 |
| WO | 2016054422 | 4/2016 |

OTHER PUBLICATIONS

Huawei, "Considerations on LTE ARQ Sub-layer", 3GPP TSG RAN WG2 Meeting #51, R2-060532, Feb. 2006, 5 pages.
PCT International Application No. PCT/KR2017/004476, Notification of Transmittal of the International Search Report and the Written Opinion of the International Searching Authority, or Declaration dated Jul. 28, 2017, 18 pages.
3rd Generation Partnership Project (3GPP), "Technical Specification Group Radio Access Network; Evolved Universal Terrestrial Radio Access (E-UTRA); Radio Link Control (RLC) protocol specification (Release 13)," 3GPP TS 36.322 V13.1.0, Mar. 2016, 44 pages.
Japan Patent Office Application No. 2018-548045, Office Action dated Sep. 3, 2019, 5 pages.
U.S. Appl. No. 16/395,998, Office Action dated Nov. 27, 2019, 14 pages.
European Patent Office Application Serial No. 17792835.5, Search Report dated Nov. 18, 2019, 9 pages.
3rd Generation Partnership Project; Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 13), 3GPP TS 36.523-1 V13.0.0, Apr. 2016, XP051088551, pp. 1103-1259.
Fischer et al., "User Plane Protocols", Feb. 2009, XP055115879, 32 pages.
3rd Generation Partnership Project; Technical Specification Group Radio Access Network; Evolved Universal Terrestrial Radio Access (E-UTRA) and Evolved Packet Core (EPC); User Equipment (UE) conformance specification; Part 1: Protocol conformance specification (Release 13), 3GPP TS 36.523-1 V13.0.0, Mar. 2016, XP051088548, 30 pages.
3rd Generation Partnership Project; Technical Specification Group Radio Access Network; Evolved Universal Terrestrial Radio Access (E-UTRA); Radio Link Control (RLC) protocol specification (Release 13), 3GPP TS 36.322 V13.1.0, Mar. 2016, XP055440464, 40 pages.

* cited by examiner (a) Control-Plane Protocol Stack (b) User-Plane Protocol Stack

METHOD AND DEVICE FOR TRANSMITTING/RECEIVING LAYER-2 PDUS IN A WIRELESS COMMUNICATION SYSTEM

CROSS-REFERENCE TO RELATED APPLICATIONS

This application is a continuation of U.S. patent application Ser. No. 15/775,720, filed on May 11, 2018, now U.S. Pat. No. 10,334,477, which is the National Stage filing under 35 U.S.C. 371 of International Application No. PCT/KR2017/004476, filed on Apr. 27, 2017, which claims the benefit of U.S. Provisional Application No. 62/331,392, filed on May 3, 2016, the contents of which are all hereby incorporated by reference herein in their entirety.

TECHNICAL FIELD

The present invention relates to a wireless communication system, and more particularly, to a method and apparatus for transmitting a data unit.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication. In addition, a communication system design considering a service/UE sensitive to reliability and latency is being discussed. The introduction of next-generation RAT, which takes into account such advanced mobile broadband communication, massive MTC (mMCT), and ultra-reliable and low latency communication (URLLC), is being discussed.

DISCLOSURE

Technical Problem

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

With development of technologies, overcoming delay or latency has become an important challenge. Applications whose performance critically depends on delay/latency are increasing. Accordingly, a method to reduce delay/latency compared to the legacy system is demanded.

Also, with development of smart devices, a new scheme for efficiently transmitting/receiving a small amount of data or efficiently transmitting/receiving data occurring at a low frequency is required.

Also, a method for transmitting/receiving signals effectively in a system supporting new radio access technology is required.

The technical objects that can be achieved through the present invention are not limited to what has been particularly described hereinabove and other technical objects not described herein will be more clearly understood by persons skilled in the art from the following detailed description.

Technical Solution

In the present invention, the transmitting device attaches a sequence number (SN) for each of service data unit (SDU) elements to generate a protocol data unit (PDU) containing the SDU elements. Each of the SDU elements is a SDU or SDU segment. The PDU includes the SDU elements and respective SNs for the SDU elements. The PDU includes an indicator for each of the SDU elements, and the indicator indicating whether a corresponding SDU element is a SDU or SDU segment.

In an aspect of the present invention, there is provided a method of transmitting, by a transmitting device, a data unit. The method comprises: attaching respective sequence numbers to service data unit (SDU) elements; generating a first protocol data unit (PDU) containing the sequence numbers and the SDU elements; and transmitting the first PDU. Each of SDU elements is a SDU or a SDU segment. The first PDU includes an indicator for each of the SDU elements. The indicator indicates whether a corresponding SDU element is a SDU or a SDU segment.

In another aspect of the present invention, there is provided a transmitting device for receiving a data unit. The transmitting device comprises: a radio frequency (RF) unit, and a processor configured to control RF unit. The processor attaches respective sequence numbers to service data unit (SDU) elements; generates a first protocol data unit (PDU) containing the sequence numbers and the SDU elements; and controls the RF unit to transmit the first PDU. Each of SDU elements is a SDU or a SDU segment. The first PDU includes an indicator for each of the SDU elements. The indicator indicates whether a corresponding SDU element is a SDU or a SDU segment.

In each aspect of the present invention, a second PDU containing a second segment of a first SDU may be generated as a second SDU element. The second PDU may contains a sequence number for the second SDU element. The first PDU may include a first segment of the first SDU as one of the SDU elements. A sequence number for the first segment in the first PDU and the sequence number for the second segment in the second PDU may be the same.

In each aspect of the present invention, if the first PDU includes a first SDU segment as one of the SDU elements, the first PDU may further include information indicating a position of the first SDU segment in an original SDU.

In each aspect of the present invention, the information may be corresponding to a segment order of the first SDU segment in the original SDU.

In each aspect of the present invention, each of the sequence numbers may uniquely identify a corresponding SDU.

In each aspect of the present invention, if the first PDU includes a first SDU segment as one of the SDU elements, a sequence number for the first SDU segment may identify a SDU from which the first SDU segment is originated.

In each aspect of the present invention, the first PDU may further includes a framing info (FI) field for each of the SDU elements. The FI field for each of the SDU elements may indicate whether the first byte of a corresponding SDU element is the first byte of a corresponding original SDU and whether the last byte of the corresponding SDU element is the last byte of the corresponding original SDU.

In each aspect of the present invention, the SDU elements may be located in the order of sequence numbers in the first PDU.

In each aspect of the present invention, if the first PDU includes one or two SDU segments, the one or two SDU segments may be located in the order of sequence numbers in the first PDU.

In each aspect of the present invention, the SDU may be a RLC SDU, the SDU segment may be a RLC SDU segment, and the first PDU may be a MAC PDU.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, radio communication signals can be efficiently transmitted/received. Therefore, overall throughput of a radio communication system can be improved.

According to one embodiment of the present invention, a low cost/complexity UE can perform communication with a base station (BS) at low cost while maintaining compatibility with a legacy system.

According to one embodiment of the present invention, the UE can be implemented at low cost/complexity.

According to one embodiment of the present invention, the UE and the BS can perform communication with each other at a narrowband.

According to an embodiment of the present invention, delay/latency occurring during communication between a user equipment and a BS may be reduce.

Also, it is possible to efficiently transmit/receive a small amount of data for smart devices, or efficiently transmit/receive data occurring at a low frequency.

Also, signals in a new radio access technology system can be transmitted/received effectively.

According to an embodiment of the present invention, a small amount of data may be efficiently transmitted/received.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

MODE FOR INVENTION

Figure 1:
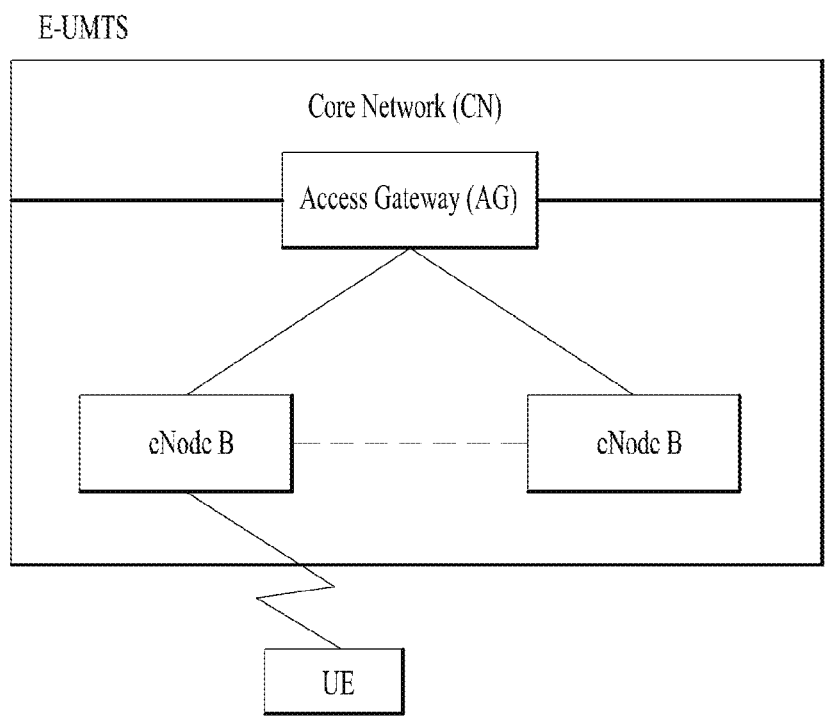
FIG. 1 is a view schematically illustrating a network structure of an E-UMTS as an exemplary radio communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, the term "assume" may mean that a subject to transmit a channel transmits the channel in accordance with the corresponding "assumption." This may also mean that a subject to receive the channel receives or decodes the channel in a form conforming to the "assumption," on the assumption that the channel has been transmitted according to the "assumption."

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port or a virtual antenna.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell.

Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of a radio resource used by the node. Accordingly, the term "cell" may be used to indicate service coverage of the node sometimes, a radio resource at other times, or a range that a signal using a radio resource can reach with valid strength at other times.

Meanwhile, the 3GPP LTE-A standard uses the concept of a cell to manage radio resources. The "cell" associated with the radio resources is defined by combination of downlink resources and uplink resources, that is, combination of DL component carrier (CC) and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

For terms and technologies which are not specifically described among the terms of and technologies employed in this specification, 3GPP LTE/LTE-A standard documents, for example, 3GPP TS 36.211, 3GPP TS 36.212, 3GPP TS 36.213, 3GPP TS 36.321, 3GPP TS 36.322, 3GPP TS 36.323 and 3GPP TS 36.331 may be referenced.

Figure 2:
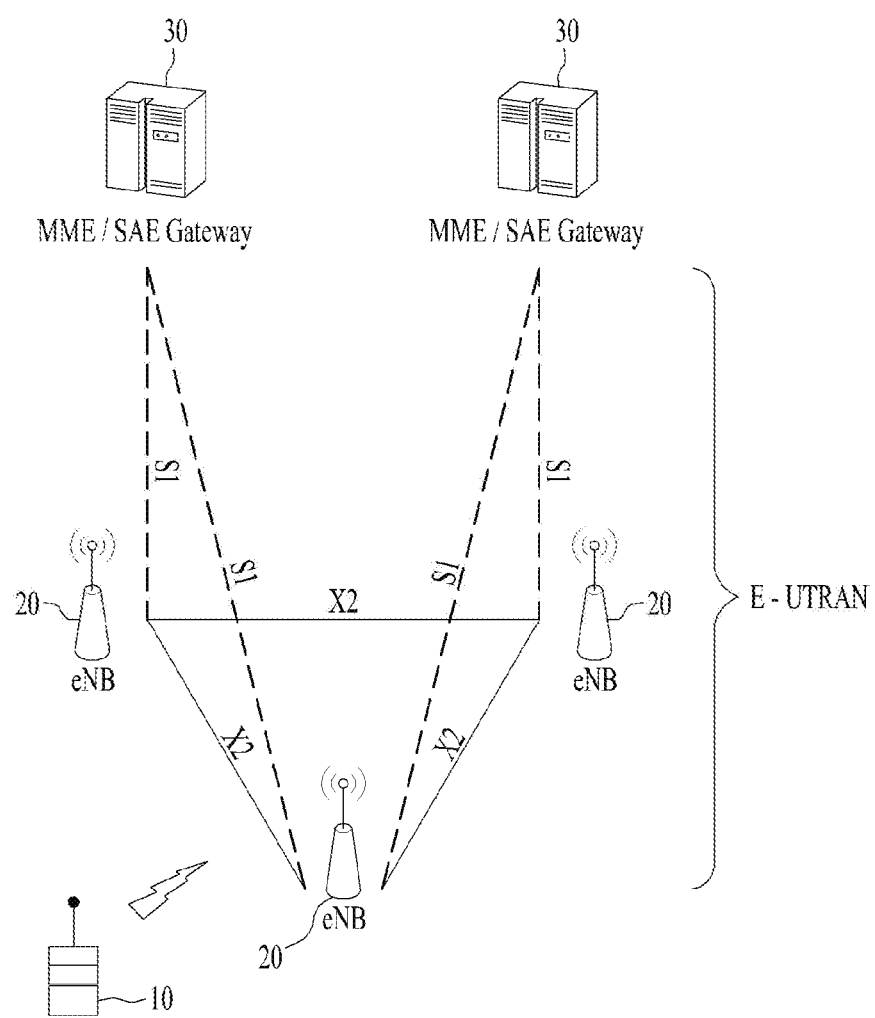
FIG. 2 is a block diagram illustrating network structure of an evolved universal mobile telecommunication system (E-UMTS).

FIG. 2 is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNB 20 to UE 10, and "uplink" refers to communication from the UE to an eNB.

Figure 3:
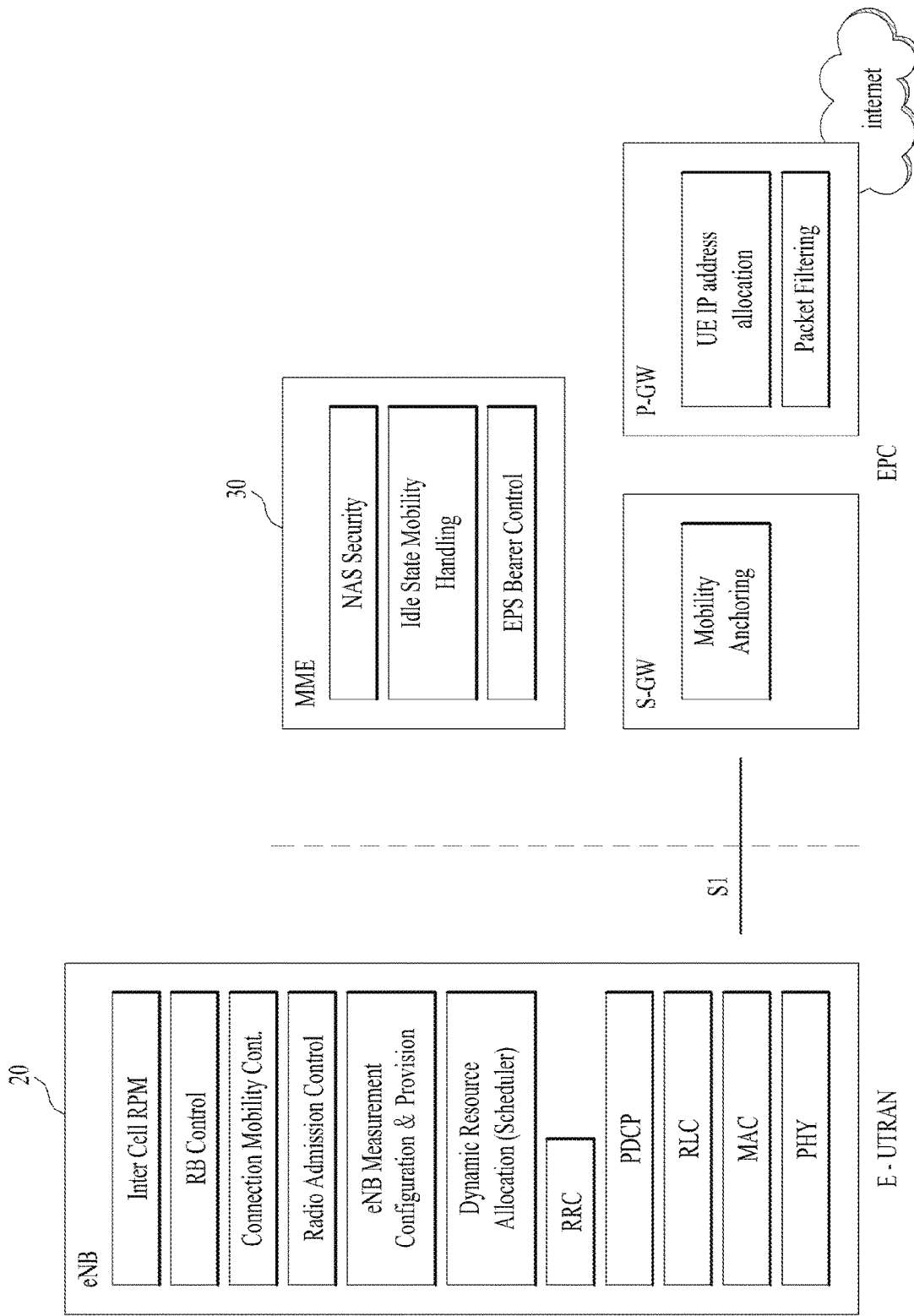
FIG. 3 is a block diagram depicting architecture of a typical E-UTRAN and a typical EPC.

FIG. 3 is a block diagram depicting architecture of a typical E-UTRAN and a typical EPC.

As illustrated in FIG. 3, an eNB 20 provides end points of a user plane and a control plane to the UE 10. MME/SAE gateway 30 provides an end point of a session and mobility management function for UE 10. The eNB and MME/SAE gateway may be connected via an Si interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including NAS signaling to eNBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, roaming, authentication, bearer management functions including dedicated bearer establishment, support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNB 20 and gateway 30 via the Si interface. The eNBs 20 may be connected to each other via an X2 interface and neighboring eNBs may have a meshed network structure that has the X2 interface.

As illustrated, eNB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 4:
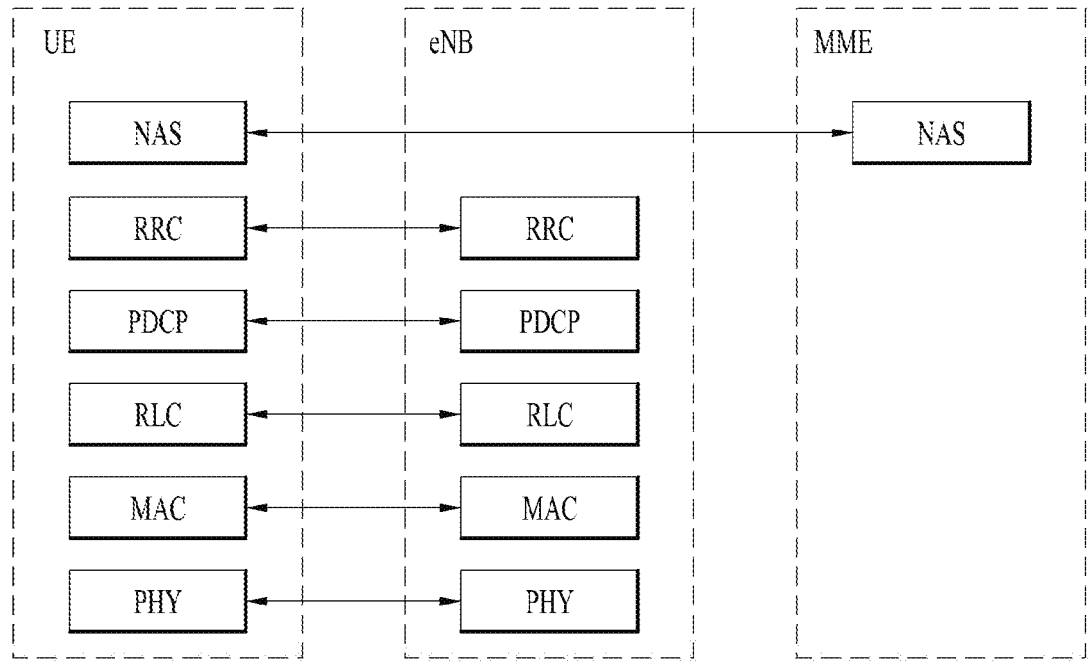
FIG. 4 is a diagram showing a control plane and a user plane of a radio interface protocol between a UE and an E-UTRAN based on a 3GPP radio access network standard.
Figure 4:
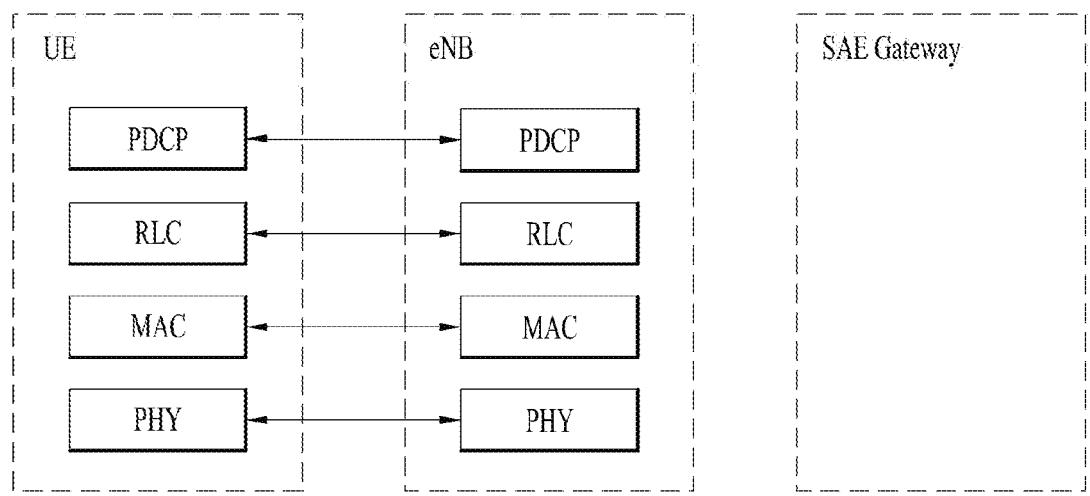

FIG. 4 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

Layer 1 (i.e. L1) of the LTE/LTE system is corresponding to a physical layer. A physical (PHY) layer of a first layer (Layer 1 or L1) provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

Layer 2 (i.e. L2) of the LTE/LTE system is split into the following sublayers: Medium Access Control (MAC), Radio Link Control (RLC) and Packet Data Convergence Protocol (PDCP). The MAC layer of a second layer (Layer 2 or L2) provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

In the LTE/LTE-A system, the MAC sublayer supports the following functions: mapping between logical channels and transport channels; multiplexing of MAC SDUs from one or different logical channels onto transport blocks (TB) to be delivered to the physical layer on transport channels; demultiplexing of MAC SDUs from one or different logical channels from transport blocks (TB) delivered from the physical layer on transport channels; scheduling information reporting; error correction through HARQ; priority handling between UEs by means of dynamic scheduling; priority handling between logical channels of one MAC entity; Logical Channel prioritization; transport format selection; radio resource selection for sidelink (SL). A MAC packet data unit (PDU) is a bit string that is byte aligned (i.e. multiple of 8 bits) in length. A MAC PDU consists of a MAC header, zero or more MAC Service Data Units (MAC SDU), zero, or more MAC control elements, and optionally padding. Both the MAC header and the MAC SDUs are of variable sizes. A MAC PDU header consists of one or more MAC PDU subheaders; each subheader corresponds to either a MAC SDU, a MAC control element or padding. MAC SDUs are bit strings that are byte aligned (i.e. multiple of 8 bits) in length. An SDU is included into a MAC PDU from the first bit onward. MAC PDU subheaders have the same order as the corresponding MAC SDUs, MAC control elements and padding. MAC control elements are always placed before any MAC SDU.

In the LTE/LTE-A system, the main services and functions of the RLC sublayer include: transfer of upper layer PDUs; error correction through ARQ (only for acknowledged mode (AM) data transfer); concatenation, segmentation and reassembly of RLC SDUs (only for unacknowledged mode (UM) and AM data transfer); re-segmentation of RLC data PDUs (only for AM data transfer); reordering of RLC data PDUs (only for UM and AM data transfer); duplicate detection (only for UM and AM data transfer); protocol error detection (only for AM data transfer); RLC SDU discard (only for UM and AM data transfer); and RLC re-establishment.

Functions of the RLC sublayer are performed by RLC entities. For a RLC entity configured at the eNB, there is a peer RLC entity configured at the UE and vice versa. An RLC entity can be configured to perform data transfer in one of the following three modes: transparent mode (TM), unacknowledged mode (UM) or acknowledged mode (AM). consequently, an RLC entity is categorized as a TM RLC entity, an UM RLC entity or an AM RLC entity depending on the mode of data transfer that the RLC entity is configured to provide.

A TM RLC entity is configured either as a transmitting TM RLC entity or a receiving TM RLC entity. The transmitting TM RLC entity receives RLC SDUs from upper layer and sends RLC PDUs to its peer receiving TM RLC entity via lower layers. The receiving TM RLC entity delivers RLC SDUs to upper layer and receives RLC PDUs from its peer transmitting TM RLC entity via lower layers. A TM RLC entity delivers/receives TM data (TMD) PDUs which are RLC data PDUs. When a transmitting TM RLC entity forms TMD PDUs from RLC SDUs, it shall: not segment nor concatenate the RLC SDUs; and not include any RLC headers in the TMD PDUs. When a receiving TM RLC entity receives TMD PDUs, it shall: deliver the TMD PDUs (which are just RLC SDUs) to upper layer.

An UM RLC entity is configured either as a transmitting UM RLC entity or a receiving UM RLC entity. The transmitting UM RLC entity receives RLC SDUs from upper layer and sends RLC PDUs to its peer receiving UM RLC entity via lower layers. The receiving UM RLC entity delivers RLC SDUs to upper layer and receives RLC PDUs from its peer transmitting UM RLC entity via lower layers. An UM RLC entity delivers/receives UM data (UMD) PDUs which are RLC data PDUs. When a transmitting UM RLC entity forms UMD PDUs from RLC SDUs, it shall: segment and/or concatenate the RLC SDUs so that the UMD PDUs fit within the total size of RLC PDU(s) indicated by lower layer at the particular transmission opportunity notified by lower layer; and include relevant RLC headers in the UMD PDU. When a receiving UM RLC entity receives UMD PDUs, it shall: detect whether or not the UMD PDUs have been received in duplication, and discard duplicated UMD PDUs; reorder the UMD PDUs if they are received out of sequence; detect the loss of UMD PDUs at lower layers and avoid excessive reordering delays; reassemble RLC SDUs from the reordered UMD PDUs (not accounting for RLC PDUs for which losses have been detected) and deliver the RLC SDUs to upper layer in ascending order of the RLC SN; and discard received UMD PDUs that cannot be re-assembled into a RLC SDU due to loss at lower layers of an UMD PDU which belonged to the particular RLC SDU. At the time of RLC re-establishment, the receiving UM RLC entity shall: if possible, reassemble RLC SDUs from the UMD PDUs that are received out of sequence and deliver them to upper layer; discard any remaining UMD PDUs that could not be reassembled into RLC SDUs; and initialize relevant state variables and stop relevant timers.

An AM RLC entity consists of a transmitting side and a receiving side. The transmitting side of an AM RLC entity receives RLC SDUs from upper layer and sends RLC PDUs to its peer AM RLC entity via lower layers. The receiving side of an AM RLC entity delivers RLC SDUs to upper layer and receives RLC PDUs from its peer AM RLC entity via lower layers. An AM RLC entity delivers/receives the following RLC data PDUs: AM data (AMD) PDU and/or AMD PDU segment. An AM RLC entity delivers/receives a STATUS PDU which is an RLC control PDU. When the transmitting side of an AM RLC entity forms AMD PDUs from RLC SDUs, it shall: segment and/or concatenate the RLC SDUs so that the AMD PDUs fit within the total size of RLC PDU(s) indicated by lower layer at the particular transmission opportunity notified by lower layer. The transmitting side of an AM RLC entity supports retransmission of RLC data PDUs (ARQ): if the RLC data PDU to be retransmitted does not fit within the total size of RLC PDU(s) indicated by lower layer at the particular transmission opportunity notified by lower layer, the AM RLC entity can re-segment the RLC data PDU into AMD PDU segments; and the number of re-segmentation is not limited. When the transmitting side of an AM RLC entity forms AMD PDUs from RLC SDUs received from upper layer or AMD PDU segments from RLC data PDUs to be retransmitted, it shall: include relevant RLC headers in the RLC data PDU. When the receiving side of an acknowledged mode (AM) RLC entity receives RLC data PDUs, it shall: detect whether or not the RLC data PDUs have been received in duplication, and discard duplicated RLC data PDUs; reorder the RLC data PDUs if they are received out of sequence; detect the loss of RLC data PDUs at lower layers and request retransmissions to its peer AM RLC entity; reassemble RLC SDUs from the reordered RLC data PDUs and deliver the RLC SDUs to upper layer in sequence. At the time of RLC re-establishment, the receiving side of an AM RLC entity shall: if possible, reassemble RLC SDUs from the RLC data PDUs that are received out of sequence and deliver them to upper layer; discard any remaining RLC data PDUs that could not be reassembled into RLC SDUs; initialize relevant state variables and stop relevant timers.

TMD PDU is used to transfer upper layer PDUs by a TM RLC entity. UMD PDU is used to transfer upper layer PDUs by an UM RLC entity. AMD PDU is used to transfer upper layer PDUs by an AM RLC entity. AMD PDU is used when the AM RLC entity transmits (part of) the RLC SDU for the first time, or when the AM RLC entity retransmits an AMD PDU without having to perform re-segmentation. AMD PDU segment is used to transfer upper layer PDUs by an AM RLC entity. AMD PDU segment is used when the AM RLC entity needs to retransmit a portion of an AMD PDU. For TMD PDU, only one RLC SDU can be mapped to the data field of one TMD PDU. For UMD PDU, AMD PDU and AMD PDU segment, either of the following can be mapped to the data field of one UMD PDU, AMD PDU or AMD PDU segment: zero RLC SDU segments and one or more RLC SDUs; or one or two RLC SDU segments and zero or more RLC SDUs. For UMD PDU, AMD PDU and AMD PDU segment, RLC SDU segments are either mapped to the beginning or the end of the data field. For UMD PDU, AMD PDU and AMD PDU segment, a RLC SDU or RLC SDU segment larger than 2047 octets for 11 bits length indicator (LI) can only be mapped to the end of the data field. For UMD PDU, AMD PDU and AMD PDU segment, when there are two RLC SDU segments, they belong to different RLC SDUs.

The PDCP entities are located in the PDCP sublayer. Several PDCP entities may be defined for a UE. Each PDCP entity carrying user plane data may be configured to use header compression. Each PDCP entity is carrying the data of one radio bearer. Every PDCP entity uses at most one ROHC compressor instance and at most one ROHC decompressor instance. A PDCP entity is associated either to the control plane or the user plane depending on which radio bearer it is carrying data for. PDCP provides its services to the RRC and user plane upper layers at the UE or to the relay at the eNB. The following services are provided by PDCP to upper layers: transfer of user plane data; transfer of control plane data; header compression; ciphering; and integrity protection. A PDCP entity expects the following services from lower layers per RLC entity: acknowledged data transfer service, including indication of successful delivery of PDCP PDUs; unacknowledged data transfer service; in-sequence delivery, except at re-establishment of lower layers; duplicate discarding, except at re-establishment of lower layers. The Packet Data Convergence Protocol supports the following functions: header compression and decompression of IP data flows using the ROHC protocol; transfer of data (user plane or control plane); maintenance of PDCP SNs; in-sequence delivery of upper layer PDUs at re-establishment of lower layers; duplicate elimination of lower layer SDUs at re-establishment of lower layers for radio bearers mapped on RLC AM; ciphering and deciphering of user plane data and control plane data; integrity protection and integrity verification of control plane data; integrity protection and integrity verification of sidelink one-to-one communication data; for RNs, integrity protection and integrity verification of user plane data; timer based discard; and duplicate discarding.

Layer 3 (i.e. L3) of the LTE/LTE system includes the following sublayers: Radio Resource Control (RRC) and Non Access Stratum (NAS). A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 5:
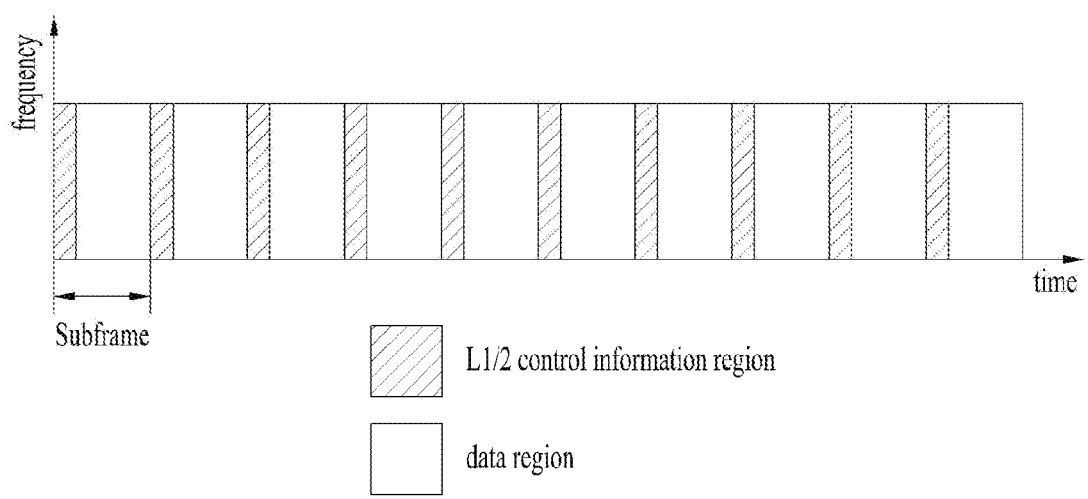
FIG. 5 is a view showing an example of a physical channel structure used in an E-UMTS system.

FIG. 5 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 5, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

A time interval in which one subframe is transmitted is defined as a transmission time interval (TTI). Time resources may be distinguished by a radio frame number (or radio frame index), a subframe number (or subframe index), a slot number (or slot index), and the like. TTI refers to an interval during which data may be scheduled. For example, in the current LTE/LTE-A system, a opportunity of transmission of an UL grant or a DL grant is present every 1 ms, and the UL/DL grant opportunity does not exists several times in less than 1 ms. Therefore, the TTI in the current LTE/LTE-A system is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

A fully mobile and connected society is expected in the near future, which will be characterized by a tremendous amount of growth in connectivity, traffic volume and a much broader range of usage scenarios. Some typical trends include explosive growth of data traffic, great increase of connected devices and continuous emergence of new services. Besides the market requirements, the mobile communication society itself also requires a sustainable development of the eco-system, which produces the needs to further improve system efficiencies, such as spectrum efficiency, energy efficiency, operational efficiency and cost efficiency. To meet the above ever-increasing requirements from market and mobile communication society, next generation access technologies are expected to emerge in the near future.

Work has started in ITU and 3GPP to develop requirements and specifications for new radio (NR) systems, as in the Recommendation ITU-R M.2083 "Framework and overall objectives of the future development of IMT for 2020 and beyond", as well as 3GPP SA1 study item New Services and Markets Technology Enablers (SMARTER) and SA2 study item Architecture for NR System. It is required to identify and develop the technology components needed for successfully standardizing the NR system timely satisfying both the urgent market needs, and the more long-term requirements set forth by the ITU-R IMT-2020 process. In order to achieve this, evolutions of the radio interface as well as radio network architecture have to be considered in the "New Radio Access Technology."

Figure 6:
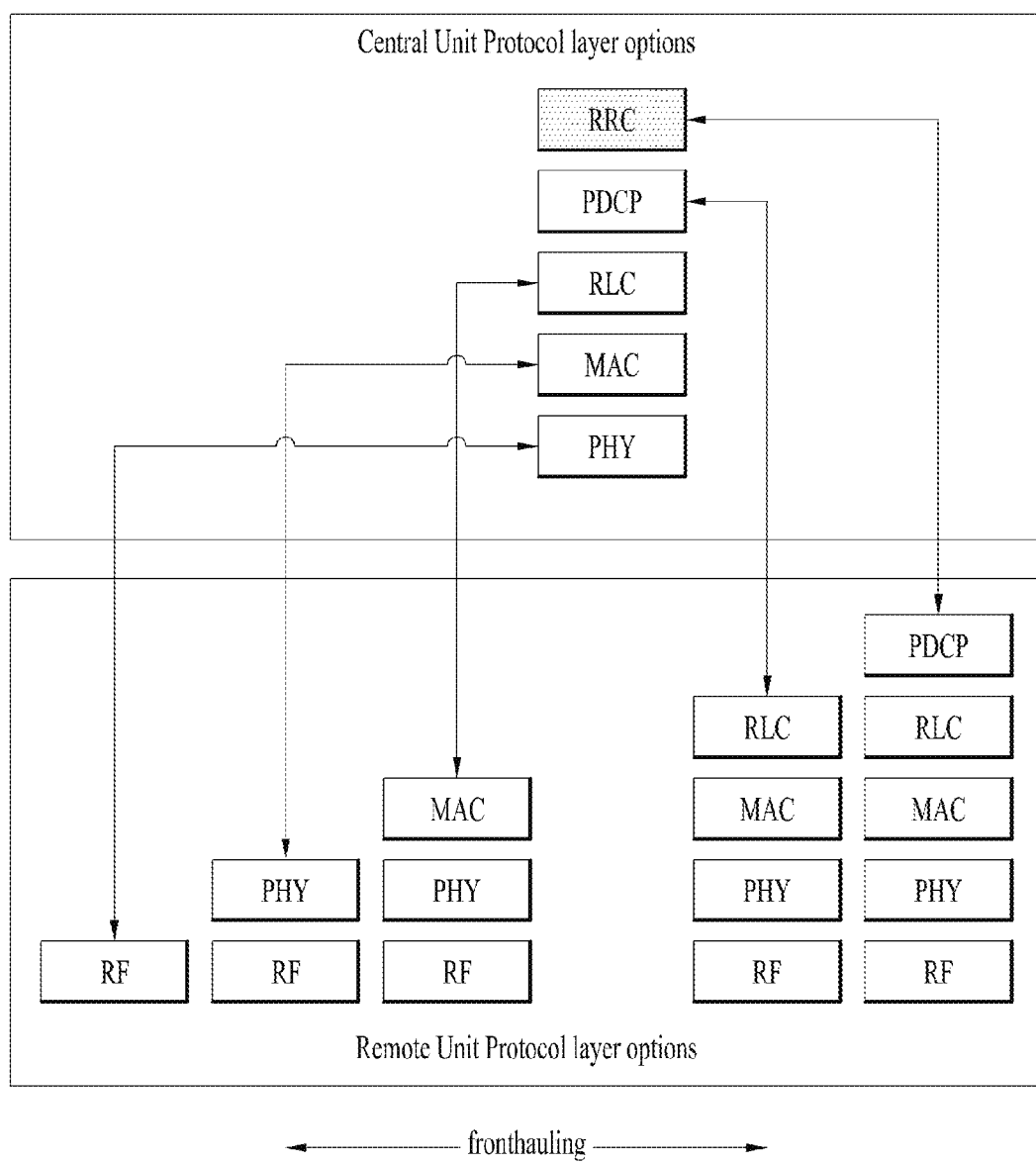
FIG. 6 illustrates examples of functional spilt options between protocol layers in the next generation system.

FIG. 6 illustrates examples of functional spilt options between protocol layers in the next generation system.

The concept of backhaul is used in the LTE/LTE-A system. The backhaul, at its simplest, links the mobile network back to the wired network. In the 5G new radio access technology (New RAT), the concept of fronthauling is introduced. The fronthauling indicates the transport capabilities and interfaces between internal RAN nodes, currently not specified by 3GPP. The fronthauling means that the standardized interface between radio protocol layers. The basic example of fronthauling is the connection and consequent transport functionality between a central unit and a remote unit. A central unit includes full/partial baseband functions and higher layer control functions. It handles multiple cells and serves as a function pool. A remote unit may include the functions of traditional remote radio units and possibly partial baseband functions. For fronthauling, different functional split options are considered. FIG. 6 shows candidate fronthauling options dependent on the function splits between a central unit and remote unit, as well as possible implementation/deployment of multiple fronthauling in one network.

Consequently, it is possible that different protocol layers can be located in different network nodes. For example, a PDCP entity may be located in central unit, while a RLC entity associated with the PDCP entity may be located in remote unit. Moreover, one remote unit may be connected with multiple central units. In other words, one remote unit can be shared between multiple central units.

In the LTE/LTE-A system, when an MAC entity receives a UL grant from an eNB, the MAC entity performs Logical Channel Prioritization (LCP) procedure to decide the RLC size for each RLC entity mapped to the MAC entity. Then, the MAC entity indicates the decided RLC size to each RLC entity. When the RLC entity receives the indication of the RLC size from the MAC entity, the RLC entity performs segmentation/concatenation of RLC SDUs to be fit into the indicated RLC size. RLC segmentation only occurs when needed and RLC concatenation is done in sequence. After receiving RLC PDUs from the RLC entities mapped to the MAC entity, the MAC entity constructs a MAC PDU by concatenating received RLC PDUs and potentially MAC Control Elements, and by attaching an MAC header. Then, the MAC entity transmits the constructed MAC PDU using the received UL grant.

As can be seen from the above procedure, the UE performs many processes between the UL grant reception and UL data transmission, and thus the time between them is quite long. The most time-consuming process is segmentation/concatenation of RLC SDUs, which is the essential process to support variable MAC PDU size. In the 5G New RAT system, it is important to minimize processing time between the UL grant reception and UL data transmission in order to ensure ultra-low latency.

Moreover, in the LTE/LTE-A system, both PDCP and RLC attach respective SNs. The size of PDCP SN field is 1-3 bytes, and the size of RLC SN field is 1-2 bytes. In addition, MAC attaches MAC headers. As lots of bytes are consumed by the L2 headers, it is essential to reduce L2 header overhead in the 5G New RAT system.

In LTE, user plane protocol has been designed for relatively lower data rate, i.e., 100 Mbps in the beginning. On the other hand, NR is required to support very high data rate up to peak 20 Gbps which is 200 times more than LTE peak rate. This means that computation of both network and UE will be increased roughly 200 times for both uplink and downlink. Achieving NR peak rate is very challenging, especially in UE side which has constraint on processing and power consumption. Moreover, real-time processing from UL grant to data transmission can be a potential bottleneck in UE. As a consequence of high data rate, the amount of data processed during one TTI is increased. For instance, if we assume that the downlink data rate is 20 Gbps, the TTI length is 1 ms, the size of all the PDCP SDUs is 1500-Byte, and the size of header is ignored, then the data bits transmitted in one TTI would be 20 Gbits/1000=20 Mbits and the number of PDCP SDUs transmitted in one TTI should be 20 Mbits/(1500×8)=1666.6. This means that we need to concatenate at least 1666 RLC SDUs into one RLC PDU within each TTI, which seems very tough. Also, shorter TTI value can be considered to reduce latency. Then, this reduced timeline makes more difficult on real-time processing. Accordingly, user plane protocol in NR should be simplified and designed processing-friendly for both downlink and uplink.

Accordingly, the present invention proposes new L2 entities to minimize the processing time and signaling overhead.

Figure 7:
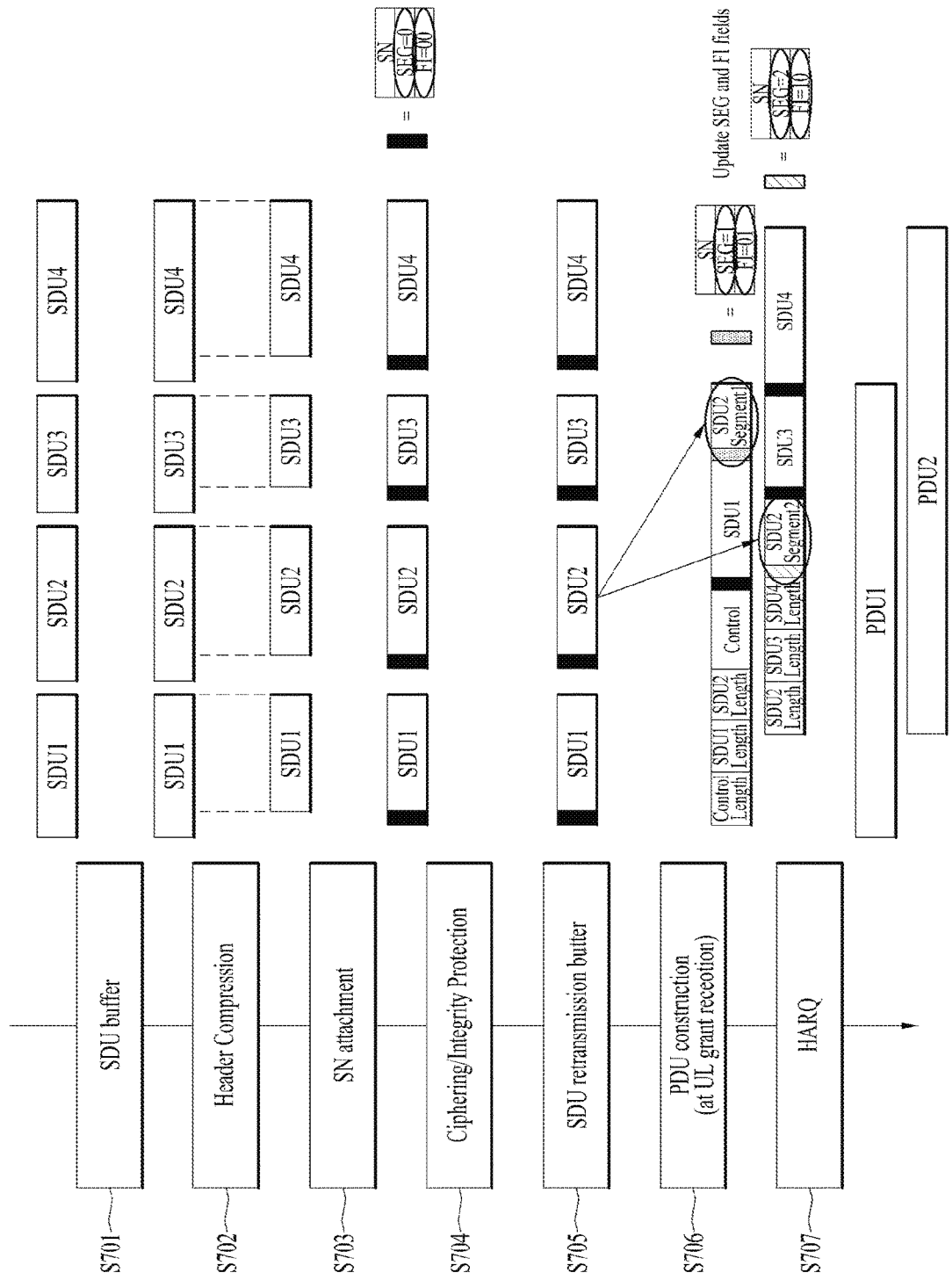
FIG. 7 and FIG. 8 illustrates examples of the L2 entity according to the present invention.
Figure 8:
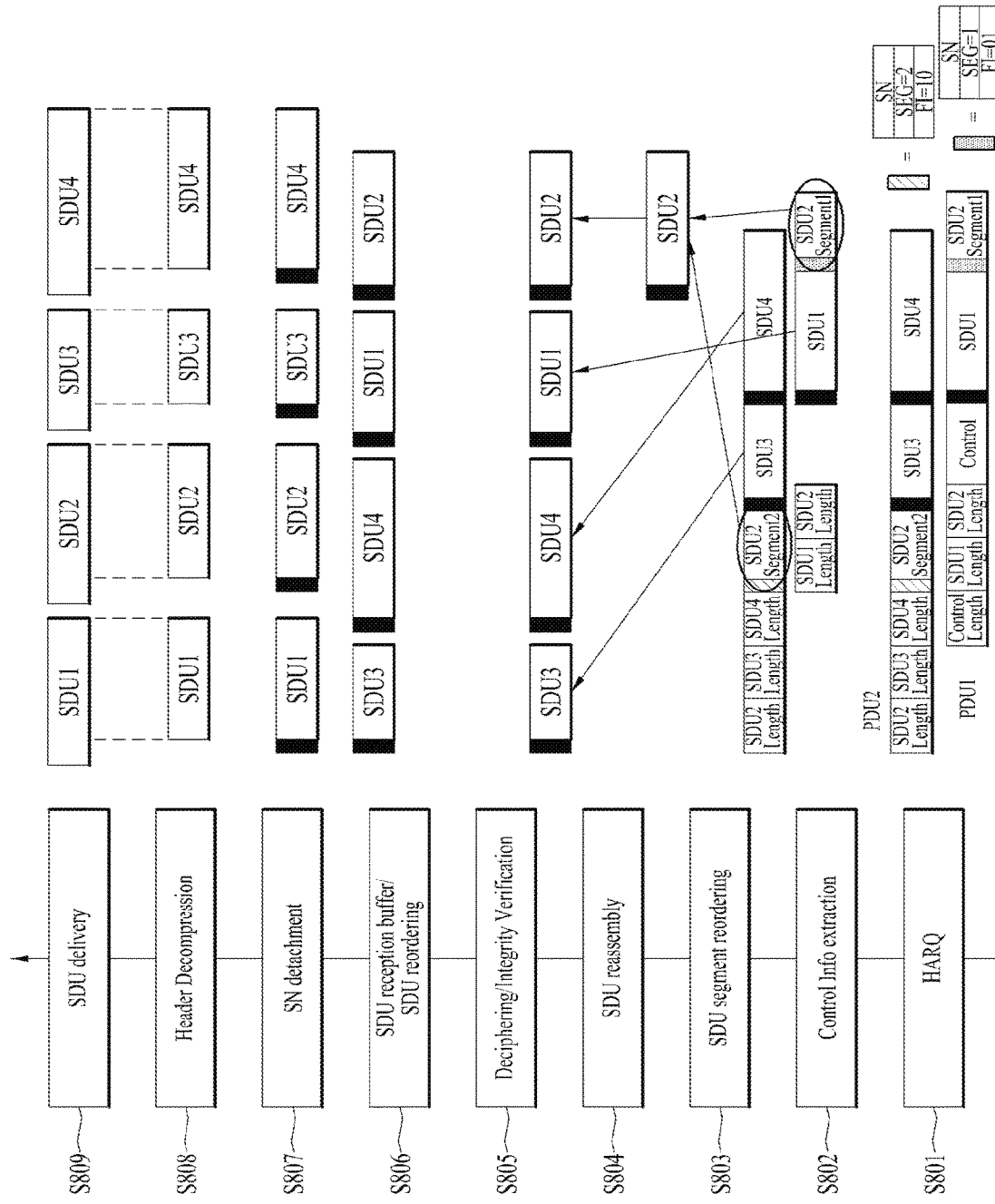

FIG. 7 and FIG. 8 illustrates examples of the L2 entity according to the present invention. Especially, FIG. 7 shows an example of L2 entities at a transmitting side, and FIG. 8 shows an example of L2 entities at a receiving side.

A transmitting (TX) side of the present invention can process data to be transmitted to a receiving side as shown in FIG. 7. The TX side of the present invention can comprise an SDU buffer, a header compression entity, an SN attachment entity, a ciphering/integrity protection entity, an SDU retransmission buffer, a PDU construction entity and a HARQ entity. These functional entities may perform S701 to S707, respectively. Alternatively, one or more L2 entities at the TX side can perform S701 to S707 to produce L2 PDU(s) according to the present invention. In other words, the SDU buffer, the header compression entity, the SN attachment entity, the ciphering/integrity protection entity, the SDU retransmission buffer, the PDU construction entity and the HARQ entity may be implemented by one L2 entity/sublayer, or by more than one L2 entity/sublayer. For example, the entities corresponding to S701 and S704 may be implemented by one L2 entity/sublayer (e.g. PDCP), the entities corresponding to S705 and S706 may be implemented by another L2 entity/sublayer (e.g. RLC) and the entity corresponding to S707 may be implemented by further another L2 entity/sublayer (e.g. MAC).

Referring to FIG. 7, especially, one or more L2 entities of the transmitting (TX) side may process SDU(s) as follows.

For each SDU and/or for each SDU segment, a sequence number (SN) field, segmentation (SEG) field, and/or framing Info (FI) field are attached. The total length of SN, SEG, and FI fields are byte-aligned. Hereinafter, an SDU or SDU segment included in a PDU is referred to as an SDU element.

Figure 9:
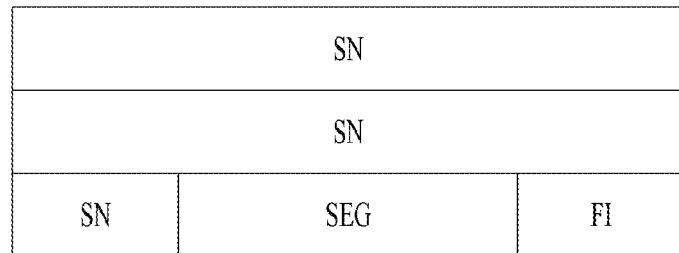
FIG. 9 illustrates an example of a (sub-)header for an SDU or SDU segment according to the present invention.

FIG. 9 illustrates an example of a (sub-)header for an SDU or SDU segment according to the present invention. For example, for each SDU and/or for each SDU segment, 18 bits SN field, 4 bits SEG field, 2 bits H field may be used.

The SN field of the present invention is set to a value that uniquely identifies the SDU (S703). All the SDU segments belonging to the same SDU have the same SN value that is allocated to the SDU.

The SEG field indicates whether the corresponding SDU element is a complete SDU or an SDU segment. A special value, e.g. 0, is used to indicate that it is a complete SDU. If it is an SDU segment, the SEG field is set to a certain value to indicate the segment order of the SDU segment within the SDU, e.g. SEG=1 for the first segment, SEG=2 for the second segment, and so on.

The FI field indicates whether the first byte of the SDU element is the first byte of the original SDU and whether the last byte of the SDU element is the last byte of the original SDU. For example, if FI is two bits, the following definition can be used:

FI=00: The first byte of the SDU element is the first byte of the original SDU and the last byte of the SDU element is the last byte of the original SDU.

FI=01: The first byte of the SDU element is the first byte of the original SDU and the last byte of the SDU element is not the last byte of the original SDU.

FI=10: The first byte of the SDU element is not the first byte of the original SDU and the last byte of the SDU element is the last byte of the original SDU.

FI=11: The first byte of the SDU element is not the first byte of the original SDU and the last byte of the SDU element is not the last byte of the original SDU.

Before segmentation (S706) is applied to an SDU, the SEG field is set to a special value, e.g. 0, and the FI field is set to 00.

After segmentation (S706) is applied to an SDU, for each SDU segment, the SEG field is updated to a certain value according to the segment order in the SDU, and the FI field is updated to 01, 10, or 11 according to whether the segmentation is performed for the first and last byte of the SDU element.

The segmentation may be performed only for the first SDU element or the last SDU element in the L2 PDU. In other words, an L2 PDU may contains an SDU segment as the first or last SDU element. The middle SDU elements in the L2 PDU are complete SDUs, and cannot be an SDU segment.

When the UL grant is received, the L2 entity (e.g. PDU construction entity) constructs a L2 PDU (S706) by segmenting/concatenating SDUs stored in the SDU retransmission buffer.

The L2 PDU header is attached in front of the PDU, and includes Type and Length Indicator (LI) field for each SDU, SDU segment, and Control Element (if included). The Type field indicates whether the corresponding payload is SDU, SDU segment, or Control Element. The LI field indicates the length of corresponding payload.

For each SDU and SDU segment, the L2 PDU header may include at least one of LI, SN, SEG, and FI fields.

The Control Element (CE) can be defined to be transmitted as a separate L2 PDU, i.e. L2 Control PDU. In this case, there is no Control Element in the L2 Data PDU. The L2 PDU header may include D/C field to indicate whether the L2 PDU is a Data PDU or a Control PDU.

Header compressed (S702) and ciphered/integrity protected (S704) SDUs are stored in the SDU retransmission buffer (S705). The SN, SEG, and FI fields may or may not be stored with the SDU in the SDU retransmission buffer.

When the L2 status report is received, the L2 entity retransmits the SDU stored in the SDU retransmission buffer that is indicated as NACK in the L2 status report (S707).

A receiving (RX) side of the present invention can process data received from a TX side as shown in FIG. 8. The RX side of the present invention can comprise a HARQ entity, a control information extraction entity, an SDU segment reordering entity, an SDU reassembly entity, a deciphering/integrity verification entity, an SDU reception buffer/SDU reordering entity, an SN detachment entity, a header decompression entity and an SDU delivery entity. These functional entities may perform S801 to S809, respectively. Alternatively, one or more L2 entities at the RX side can perform S801 to S809 to obtain SDUs from L2 PDUs according to the present invention. In other words, the HARQ entity, the control information extraction entity, the SDU segment reordering entity, the SDU reassembly entity, the deciphering/integrity verification entity, the SDU reception buffer/SDU reordering entity, the SN detachment entity, the header decompression entity and the SDU delivery entity may be implemented by one L2 entity/sublayer, or by more than one L2 entity/sublayer. For example, the entity corresponding to S801 may be implemented by an L2 entity/subheader (e.g. MAC) and the entities corresponding to S802 to S804 may be implemented by another L2 entity/sublayer (e.g. RLC), and the entities corresponding to S805 to S809 may be implemented by further another L2 entity/sublayer (e.g. PDCP).

Referring to FIG. 8, especially, one or more L2 entities of the receiving (RX) side may process SDU(s) as follows.

The RX side of the present invention may perform two types of reordering. The first type is SDU segment reordering and the second type is SDU reordering.

The SDU segment reordering is performed for SDU segments by using SN, SEG, and FI fields (S803). The L2 entity waits for receiving all SDU segments belonging to the same SDU. This can be achieved by checking whether the first bit of FI=0 and the last bit of FI=0 are received and whether all SEGs are consecutive.

The L2 entity may use segment reordering timer to receive all the SDU segments of an SDU. The L2 entity starts the timer when an SDU segment of an SDU is received, and stops the timer when all SDU segments of an SDU are received. When the timer expires, the L2 entity considers the SDU that has at least one missing SDU segment as missing, and discards all SDU segments of the SDU. The L2 entity may transmit L2 segment status report to the peer L2 entity to request retransmission of the missing SDU segment.

In the legacy LTE/LTE-A system, an RLC entity of an RX side reorders RLC data PDUs if they are received out of sequence, reassembles RLC SDUs from the reordered RLC data PDUs and delivers the RLC SDUs to PDCP in sequence. Then, the PDCP deciphers/integrity verifies the RLC SDUs received from the RLC in sequence. In other words, in the legacy LTE/LTE-A system, RLC SDUs are deciphered/integrity verified after the RLC SDUs are reordered to be delivered in sequence. In the next generation communication system, it is expected that a large amount of lower layer PDUs may arrive at an RX side simultaneously. In this case, the in-sequence delivery of SDUs may cause delay since the in-sequence deliver can be performed after the whole lower layer PDUs containing the SDUs needed for the in-sequence delivery is received at an in-sequence delivery entity. Besides, if the large amount of SDUs are delivered to the deciphering/integrity verification entity at once, it may take too much load for deciphering/integrity verification of the SDUs. Accordingly, the present invention proposes to allow out-of-order delivery of complete SDUs to a deciphering/integrity verification entity (e.g. PDCP) after SDU reassembly (S804). When the L2 entity performs SDU segment reordering, the L2 entity does not support SDU in-order delivery. In other words, once all SDU segments of an SDU are received, the L2 entity delivers the complete SDU to upper function entity (i.e. deciphering/integrity verification) immediately regardless of SN order. According to the present invention, out-of-order deciphering of the SDUs (e.g. PDCP PDUs) is possible at the deciphering/integrity verification entity (S805).

Although FIG. 8 shows that there are four function entities corresponding to S806 to S809, functions corresponding to S806 to S809 can be performed at one function entity (e.g. an SDU reordering buffer), and some functions (e.g. S807, S808) of them may not be performed.

After performing deciphering/integrity verification of an SDU (S805), the L2 entity stores the SDU in the SDU reordering buffer (S806). In the SDU reordering buffer, the L2 entity reorders the SDUs based on the respective SNs so that they are in increasing order of SNs. If there is a missing SDU, the L2 entity may transmit an L2 status report to the peer L2 entity to request retransmission of the missing SDU. In the L2 status report, the L2 entity indicates ACK for the correctly received SDU and NACK for the missing SDU. The L2 entity may use reordering timer to receive all missing SDUs. The L2 entity starts the timer when an out-of-sequence SDU is received, and stops the timer when all SDUs are in-sequence. When the timer expires and there is at least one missing SDU, the L2 entity may transmit L2 status report to the peer L2 entity to request retransmission of the missing SDUs.

The SDU reordering buffer delivers SDUs to upper function entity in the increasing order of SN(s).

If a PDU contains multiple SDU elements, the SDU elements are located in the order of respective SNs in the PDU. As shown in FIG. 7 and FIG. 8, each SDU segment is located as the first or last SDU elements in a PDU. In other words, if a PDU contains one or two SDU segments as SDU elements, the one or two SDUs cannot be located between the first and last SDUs. SDU element(s) located in the middle of SDU elements is always a complete SDU.

The present invention has the following advantageous effects. In the legacy LTE/LTE-A system, an SN field indicates the sequence number of the corresponding UMD or AMD PDU irrespective of whether the UMD or AMD PDU includes one SDU or multiple SDUs. The sequence number of the legacy LTE/LTE-A system is incremented by one for every UMD or AMD PDU. Unlike the legacy LTE/LTE-A system, the present invention allocates an SN per SDU, not per PDU. Accordingly, if a PDU includes SDU elements from different SDUs, then the PDU according to the present invention includes respective SN values corresponding to the different SDUs. In other words, in the present invention, an L2 function entity comprising the SN attachment entity does not concatenate SDUs, even if a PDU does not fit within a PDU size indicated by a lower layer. The present invention produces a PDU containing SDU elements and corresponding SNs without concatenating the SDU elements. In the current LTE protocol, RLC PDUs and MAC subheaders cannot be pre-computed due to concatenation and segmentation. Removing concatenation has the following benefits in a TX side. If concatenation is performed in the L2 function entity (e.g. RLC) comprising the SN attachment entity, then only sequential processing is possible since SDUs multiplexed in one PDU can be determined only after completion of the other PDU, and thus SN attachment can be performed to a PDU after concatenation of SDUs for the PDU. On the other hand, if no concatenation is performed in the L2 function entity (e.g. RLC) comprising the SN attachment entity, then parallel processing is possible since SDUs (e.g. PDCP PDUs) multiplexed in one PDU (e.g. MAC PDU) can be determined regardless of the other PDU, and SN attachment can be performed to SDUs in parallel. Additionally, by placing MAC subheaders adjacent to MAC SDU, the pre-computation of MAC can be possible. This means that a complete MAC PDU can be ready before UL grant. One more potential benefit is that the MAC entity can start forwarding MAC SDUs to a physical layer (PHY) as soon as the first MAC SDU is ready before the MAC PDU has been fully constructed. This can relax the hardware memory requirements during processing since the MAC does not need to form the entire PDU before forwarding to the PHY. Furthermore, in order to process massive data and prevent processing bottleneck in UE side, assistance of hardware accelerator needs to be considered in some parts of user plane functions. The hardware accelerator is a separate hardware unit from main processor. By offloading in hardware accelerator, fast processing with less memory access is possible. Moreover, the offloading reduces not only the work load of main processor but also the overall power consumption of UE side. For this reason, requirement on main processor of UE can be relaxed, so the flexibility on UE implementation can be increased. This performance of hardware acceleration is maximized for repetitive and intensive work. By removing concatenation, a length indicator (LI) field is not necessary, RLC PDU structure becomes simpler. Most RLC PDUs consists of one fixed-size RLC header and one RLC SDU. Only the last RLC SDU has additionally segment offset (SO) field. Also, LI field in RLC and length (L) field in MAC are unified by L field. Thus, header structure becomes simpler. Furthermore, concatenation and multiplexing, which are considered as similar functions, are merged by multiplexing. This simplification also reduces the effort of UE implementation design, which is considered as another hidden cost. This structure is favorable for TX processing by hardware accelerator.

Removing concatenation has the following benefits in a RX side. As same as TX side, assistance of hardware accelerator for fast processing needs to be considered in UE RX side. Similarly, removing concatenation brings UE RX side more suitable structure for hardware accelerator, i.e., simple, repetitive and intensive work. A problem of LTE concatenation for the hardware acceleration is that receiver does not know how many SDUs are concatenated. Thus, sufficiently large memory size should be reserved for decoding RLC header. It is not only inefficient but also decreasing RX processing speed. Dispersed fixed-size RLC header by removing concatenation can be thought as an efficient structure. This efficiency can be achieved for MAC subheaders adjacent to MAC SDU as well. RLC reassembly can be started only if a whole MAC PDU arrives at MAC entity. Due to the headers at the end of MAC PDU, the reassembly should be suspended, so processing latency of receiver side is increased. Since MAC entity should buffer MAC PDU until the complete reception, additional memory for buffering is necessary.

Furthermore, RLC sequence numbering and ARQ seem to be a non-real-time processing whereas concatenation in LTE user plane architecture is a real-time processing related to scheduling. By removing concatenation, the placement of sequence numbering and ARQ can be independent of scheduling because physical resource allocation based on link quality is not necessary for sequence numbering. For instance, split option that RLC sequence numbering and ARQ in CU and scheduling function in DU is possible. Also, removing concatenation can be applied, without any restriction, to the other options that they are located at the same place. As a consequence, removing concatenation increases flexibility in network implementation for CU-DU split.

In the 5G New RAT (NR) system, the central unit (CU) and the distributed unit (DU) can be split into two different nodes. One CU can be connected to multiple DUs. Therefore, whole functions of LTE L2 need to be re-considered, i.e. the processing order and the location of each function needs to be re-designed in NR. In the present invention, processing order and position of L2 functions for NR are proposed. In the following description, the division of the L2 function entities according to the CU-DU split may be realized by dividing the L2 layer. For example, functions located in a CU may be performed in the first L2 sublayer, and functions located in a DU may be performed in the second L2 sublayer.

For example, in the network side, if there is central unit (CU)—distributed unit (DU) split, the TX side and the RX side of L2 entity may be formed with one or more function entities as follows.

TX side
CU: SDU buffer, Header Compression, SN attachment, Ciphering/Integrity Protection.
DU: SDU retransmission buffer, PDU construction, HARQ.
RX side
CU: SDU delivery, Header Decompression, SN detachment, SDU reordering, Deciphering/Integrity Verification.
DU: SDU reassembly, SDU segment reordering, Control Info extraction, HARQ.

CU and DU function entities of each of the TX side and the RX side are either included in one L2 entity or two different L2 entities. For example, in a UE side, function entities of CU and function entities of DU may be corresponding to two different L2 entities, respectively, or corresponding to two different L2 sublayers, respectively.

In the network side, the CU and DU entities may be located in different locations. In the UE side, both the CU and DU entities are located in the UE, and the split between CU and DU entities is only a logical split.

Figure 10:
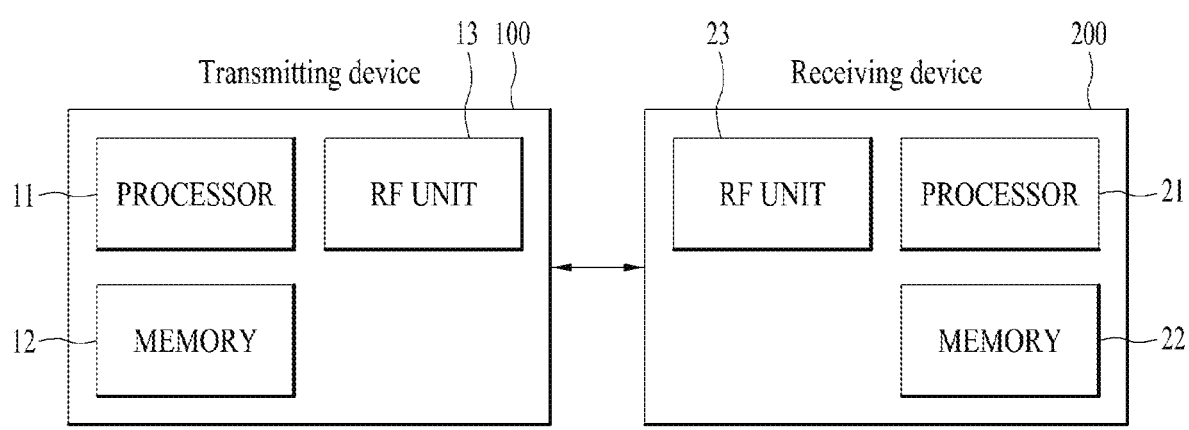
FIG. 10 is a block diagram illustrating elements of a transmitting device 100 and a receiving device 200 for implementing the present invention.

FIG. 10 is a block diagram illustrating elements of a transmitting device 100 and a receiving device 200 for implementing the present invention.

The transmitting device 100 and the receiving device 200 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 100 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 200 is the reverse of the signal processing process of the transmitting device 100. Under control of the processor 21, the RF unit 23 of the receiving device 200 receives radio signals transmitted by the transmitting device 100. The RF unit 23 may include Nr (where Nr is a positive integer) receive antennas and frequency down-converts each signal received through receive antennas into a baseband signal. The processor 21 decodes and demodulates the radio signals received through the receive antennas and restores data that the transmitting device 100 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 200. An RS transmitted through a corresponding antenna defines an antenna from the view point of the receiving device 200 and enables the receiving device 200 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 100 in UL and as the receiving device 200 in DL. In the embodiments of the present invention, an eNB operates as the receiving device 200 in UL and as the transmitting device 100 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The processor 11 of the transmitting device 100 may process SDUs to produce PDU(s) according to the present invention, and control the RF unit 13 to transmit radio signals containing the PDU(s) to a receiving device 200. The processor 11 may be configured with functional entities according to an example of the present invention. The processor 11 may be configured with L2 sublayers according to an example of the present invention. The processor 11 may attach SN per SDU, and produce a PDU containing one or more SDUs and zero or more SDU segments. The PDU includes an SN for each of SDU(s) and SDU segment. The processor 11 may attach the same SN to each of SDU segments obtained from a same PDU.

The RF unit 23 of the receiving device 200 may receive SDU(s) and/or SDU segment(s) from the transmitting device 100. SDU(s) and/or SDU segment(s) may be contained in PDU(s) received from the transmitting device 100. The processor 21 of the receiving device 200 may obtain SDUs from the PDU(s) according to the present invention. The PDU(s) may be MAC PDU(s). The processor 21 may be configured with functional entities according to an example of the present invention. The processor 21 may be configured with L2 sublayers according to an example of the present invention. The processor 21 may obtain SDU(s) or SDU segment(s) from the PDUs received from the transmitting device 100. The processor 21 may reassemble SDU(s) from SDU segments at a reassembly entity, and deliver SDU(s) to a deciphering/integrity verification entity out-of-order. If a complete SDU arrives at the reassembly entity, the reassembly entity may deliver the complete SDU to the deciphering/integrity verification entity immediately. In other words, SDUs are delivered from a first layer (e.g. RLC layer) having SDU reassembly function to a second layer (e.g. PDCP) having deciphering/integrity verification function out-of-order. The processor 21 performs the deciphering/integrity verification on SDUs at deciphering/integrity verification in the order of reception of the SDUs from the first layer irrespective of the order of SDU SNs. The processor 21 may reorder the deciphered/integrity verified SDUs at the second layer according to the respective SNs, and the reordered SDUs to an upper layer in sequence. For example, referring to FIG. 8, the processor 21 may reorders SDU3, SDU4, SDU1, SDU2 into SDU1, SDU2, SDU3, SDU4, and delivers the SDUs in the ascending order of respective SNs, i.e. in the order of SDU1, SDU2, SDU3, SDU4.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a network node (e.g., BS), a UE, or other devices in a wireless communication system.

What is claimed is:

1. A method for transmitting, by a transmitting device, a data unit, the method comprising:
generating a first protocol data unit (PDU) and a second PDU,
wherein the first PDU contains a first sequence of service data unit (SDU) elements, the first sequence including zero or one first data unit, one or more second data units and a third data unit, the first data unit including a first header followed by one SDU segment, each second data unit including a second header followed by a complete SDU, the third data unit including a third header followed by a first SDU segment, each SDU element of the first sequence being associated with a respective preceding header,
wherein the second PDU contains a second sequence of SDU elements, the second sequence including a fourth data unit, zero or more fifth data units and zero or one sixth data unit, the fourth data unit including a fourth header followed by a second SDU segment, each fifth data unit including a fifth header followed by a complete SDU, the sixth data unit including a sixth header followed by one SDU segment, each SDU element of the second sequence being associated with a respective preceding header, and
wherein a sequence number of the second SDU segment in the second PDU is the same as a sequence number of the first SDU segment in the first PDU,
transmitting the first PDU; and
transmitting the second PDU,
wherein each SDU element of the first and second PDUs is a SDU or a SDU segment,
wherein each of the first through sixth header includes a respective sequence number and a respective segment information field, and
wherein each SDU element of the first and second PDUs are associated with a segment information field regarding whether that SDU element is a complete SDU or is a SDU segment.

2. The method of claim 1, wherein an initial SDU element of the first sequence is a SDU segment.

3. The method of claim 1, wherein an initial SDU element of the first sequence is a complete SDU.

4. The method of claim 1, wherein a final SDU element of the second sequence is another SDU segment.

5. The method of claim 1, wherein a final SDU element of the second sequence is a complete SDU.

6. A transmitting device for transmitting a data unit, the transmitting comprising:
at least one processor, and
at least one memory that is operably connectable to the at least one processor and that has stored thereon instructions which, when executed, cause the at least one processor to perform operations comprising:
generating a first protocol data unit (PDU) and a second PDU,
wherein the first PDU contains a first sequence of service data unit (SDU) elements, the first sequence including zero or one first data unit, one or more second data units and a third data unit, the first data unit including a first header followed by one SDU segment, each second data unit including a second header followed by a complete SDU, the third data unit including a third header followed by a first SDU segment, each SDU element of the first sequence being associated with a respective preceding header,
wherein the second PDU contains a second sequence of SDU elements, the second sequence including a fourth data unit, zero or more fifth data units and zero or one sixth data unit, the fourth data unit including a fourth header followed by a second SDU segment, each fifth data unit including a fifth header followed by a complete SDU, the sixth data unit including a sixth header followed by one SDU segment, each SDU element of the second sequence being associated with a respective preceding header, and wherein a sequence number of the second SDU segment in the second PDU is the same as a sequence number of the first SDU segment in the first PDU, transmitting the first PDU; and transmitting the second PDU, wherein each SDU element of the first and second PDUs is a SDU or a SDU segment, wherein each header includes a respective sequence number and a respective segment information field, and wherein each SDU element of the first and second PDUs are associated with a segment information field regarding whether that SDU element is a complete SDU or is a SDU segment.

7. The transmitting device of claim 6, wherein an initial SDU element of the first sequence is a SDU segment.

8. The transmitting device of claim 6, wherein an initial SDU element of the first sequence is a complete SDU.

9. The transmitting device of claim 6, wherein a final SDU element of the second sequence is another SDU segment.

10. The transmitting device of claim 6, wherein a final SDU element of the second sequence is a complete SDU.

* * * * *